United States Patent Office 2,932,260
Patented Apr. 12, 1960

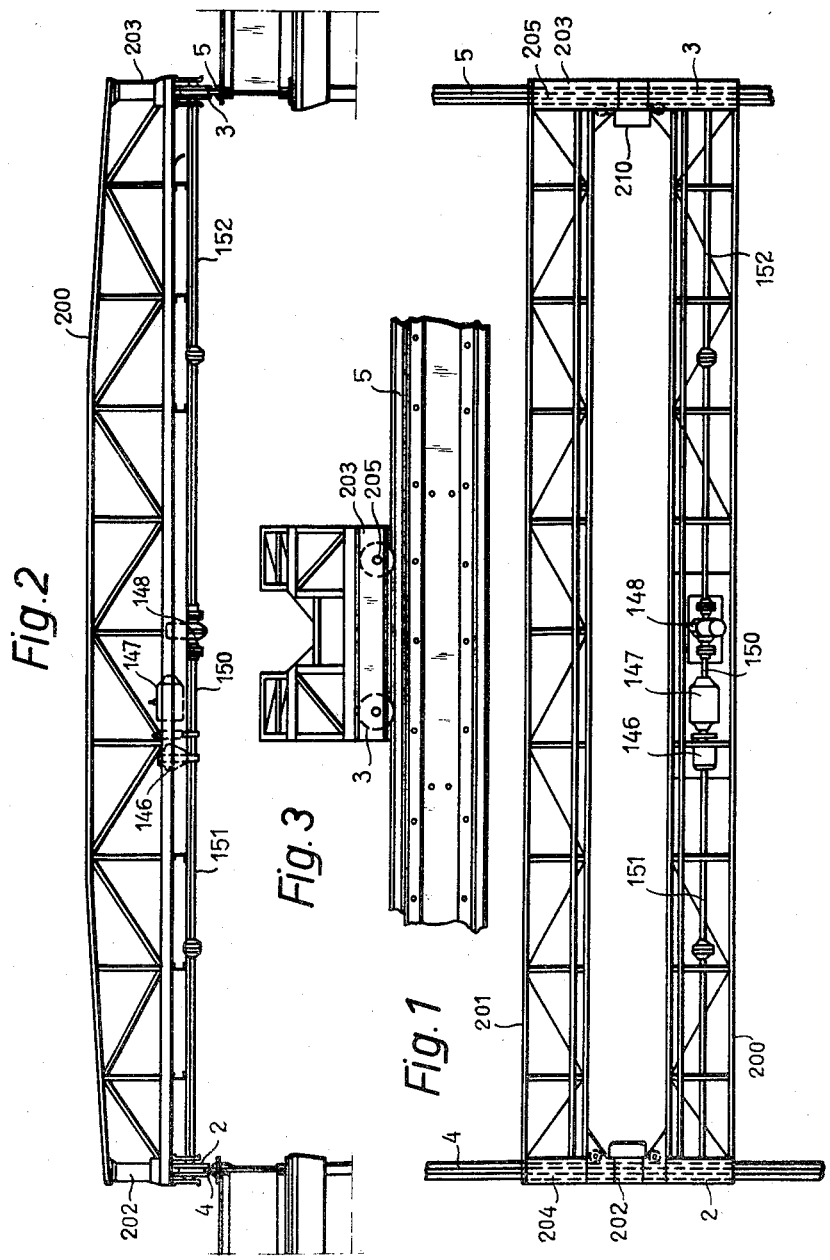

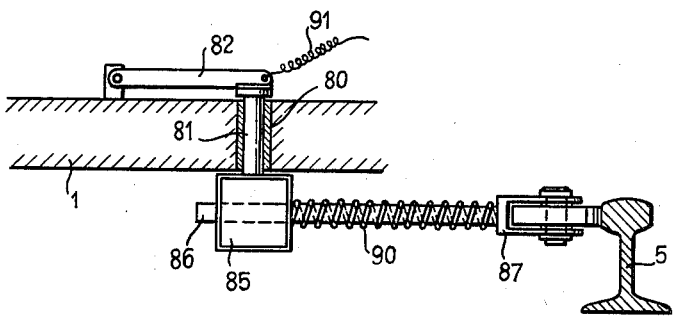
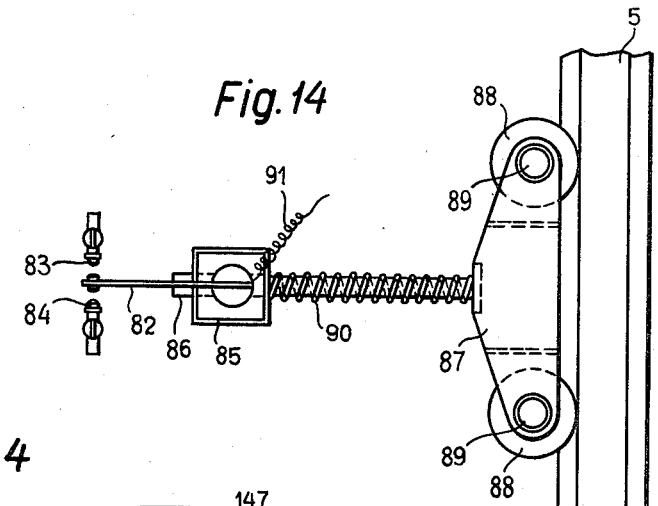
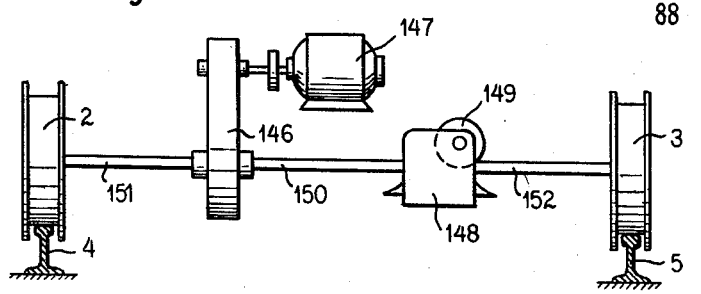

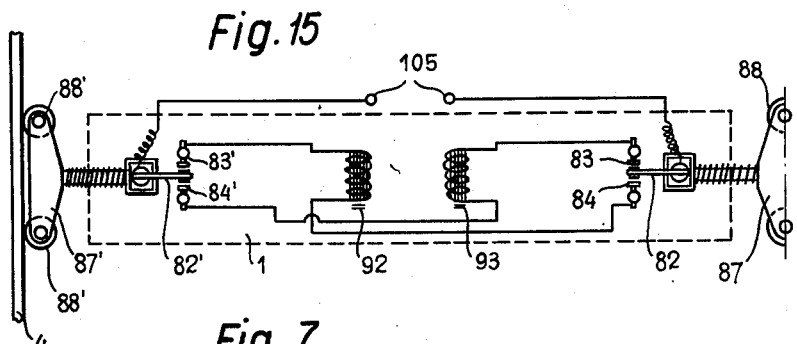
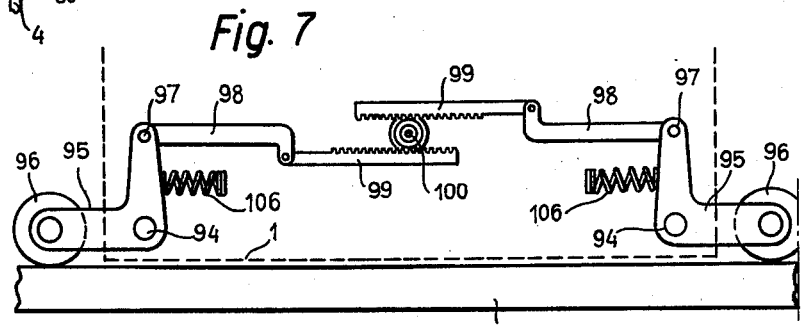
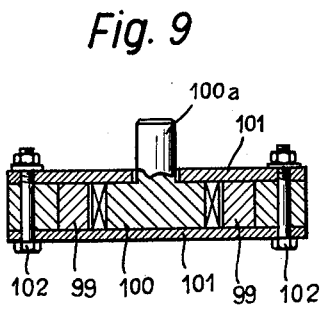
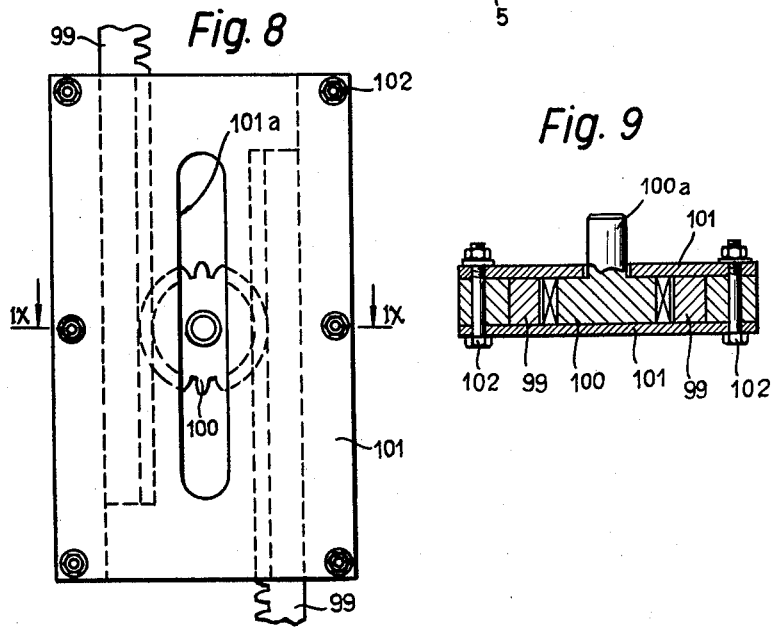

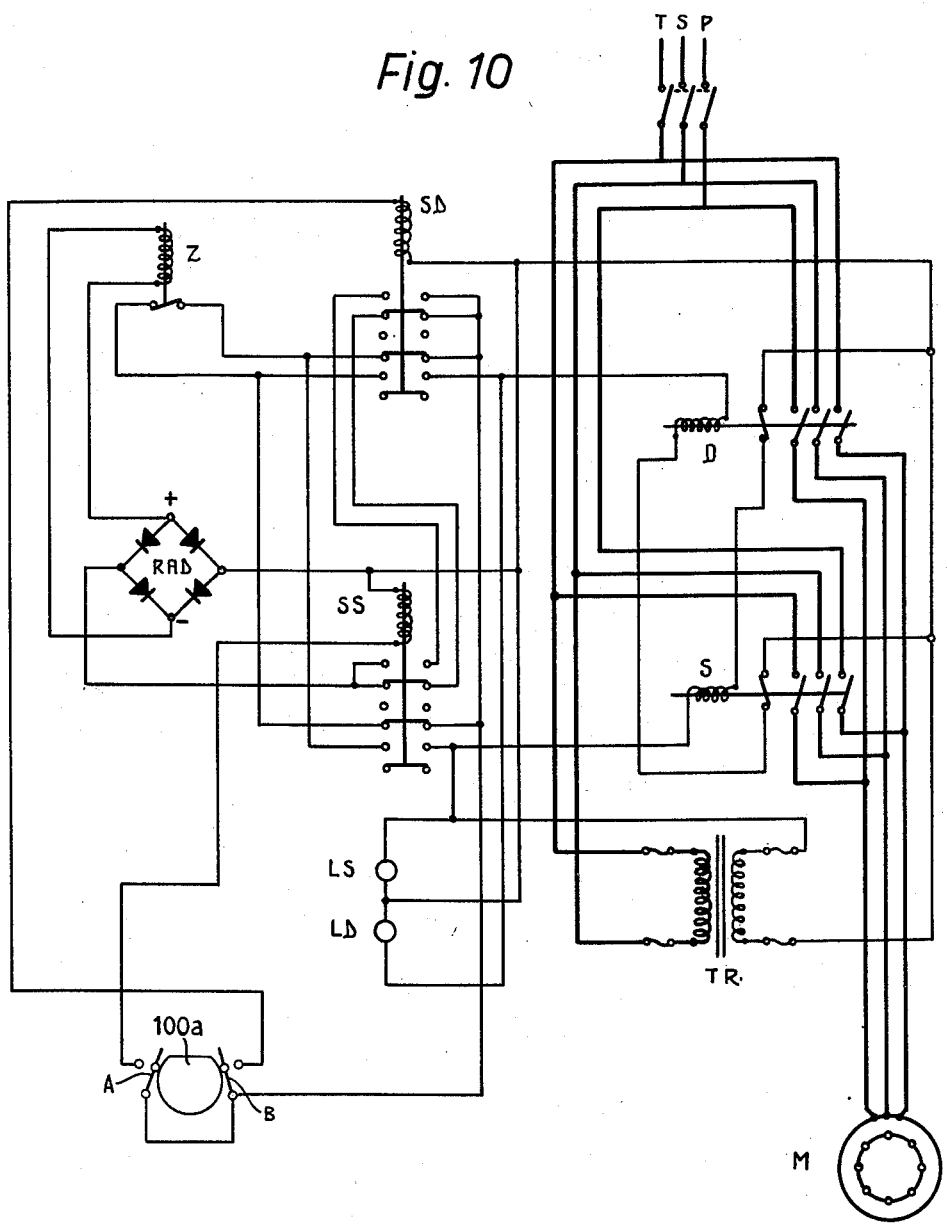

2,932,260

DEVICE FOR HOLDING CRANE BRIDGES OR THE LIKE IN REGISTER WITH THE TRACK

Sergio Puma and Augusto Monaco, Turin, Italy; said Monaco assignor to said Puma

Application December 21, 1956, Serial No. 629,894

Claims priority, application Italy December 22, 1955

1 Claim. (Cl. 105—163)

This invention relates to overhead cranes of the bridge type comprising a transversely disposed main framework rigidly connected at its ends to end trucks equipped with supporting wheels which run on an overhead rectilinear track-way and a mechanism for propelling the crane along its track-way.

It is an object of the invention to provide a bridge crane of the type set forth above with improved means for automatically maintaining it constantly in a correct position with respect to its track-way, that is, for keeping its main framework substantially square with the track-way.

Another object of the invention is to provide improved means for bridge cranes of the type disclosed above with a view to readily and without great expense converting the latter from cranes deprived of means for maintaining them constantly in line to improved cranes presenting such a feature.

According to this invention the desired results are attained through the provision on the cranes of the type referred to of means responsive to the position of the crane with respect to its track-way and of a corrector motor distinct from the driving motor of the crane, which acts on the propelling unit of the latter through a suitable differential gearing when the above mentioned means ascertains any deviation of the bridge crane from its correct position.

Other objects and advantages of the invention will become more readily apparent from the following description and the accompanying drawings in which:

Figure 1 is a diagrammatic top plan view of a bridge crane in accordance with the present invention;

Figure 2 is a side elevational view of the structure illustrated in Figure 1;

Figure 3 is an end elevational view of the views of Figures 1 and 2;

Figure 4 is an enlarged elevational view, partly broken away, of the bridge drive and corrector mechanism embodiment shown in Figures 1 to 3;

Figure 7 is a diagrammatic top plan view of a device responsive to the variation in position of the bridge crane with respect to the track-way, provided on the bridge crane in accordance with the present invention;

Figure 8 is a detail view, on an enlarged scale, of a part of the device shown in Figure 7;

Figure 9 is a vertical sectional view taken on line IX—IX of Figure 8;

Figure 10 is a diagram of the circuit feeding and controlling the motor of the device shown in Figure 6;

Figure 13 is a diagrammatic side elevational view of another embodiment of the device responsive to the variation in position of the bridge-crane with respect to the track-way;

Figure 14 is a top plan view of the device shown in Figure 13;

Figure 15 is a diagrammatic top plan view of a modified construction of the device shown in Figures 13 and 14;

Figure 11:
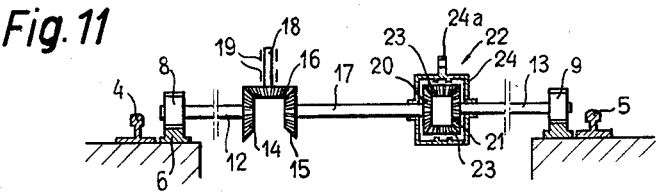
Figure 11 is a diagrammatic side elevational part sectional view of a modification of the device responsive to the variation in position of the bridge crane with respect to the track-way.

The overhead crane of the bridge type shown in Figures 1, 2 and 3 has a main frame work comprising two transversely disposed, parallel members 200 and 201 rigidly connected at their ends to supporting trucks 202 and 203 extending at right angles to said members each carrying a pair of supporting wheels 2, 204 and 3, 205, respectively. The supporting wheels of the crane run on the overhead comprising track ribs 4, 5. The wheels 2 and 3 are each secured to shafts 151 and 152, respectively, supported by the member 200 of the main framework of the crane. The latter also supports an electric driving motor 147 transmitting drive through a reducing gear 146 on one side to the shaft 151 then to the wheel 2 and on the other side to an intermediate shaft 150 and, through a corrector device 148, the structure of which will be hereafter clearly explained, to the shaft 152 then to the wheel 3.

Figure 5:
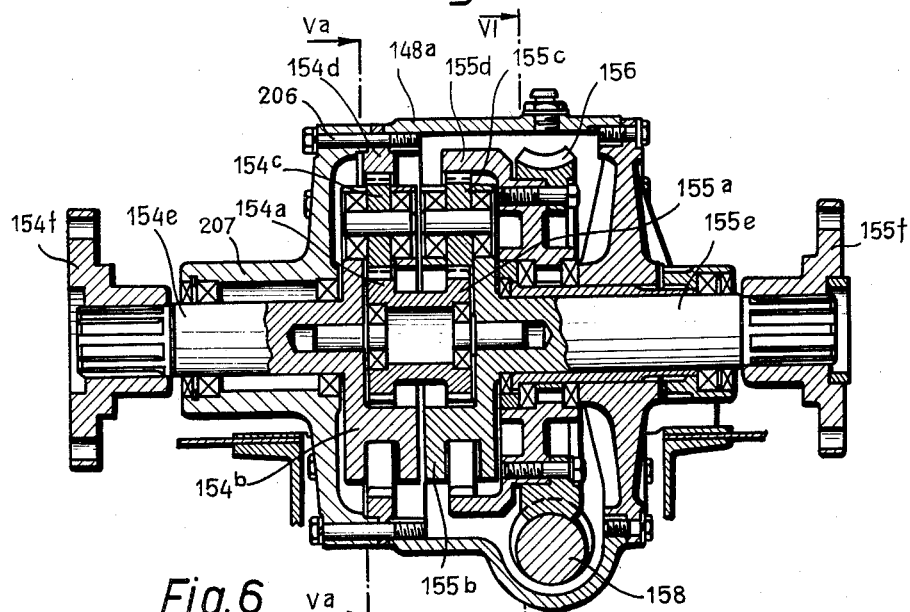
Figure 5 is an enlarged sectional view of a detail of the bridge drive shown in Figure 4.
Figure 6:
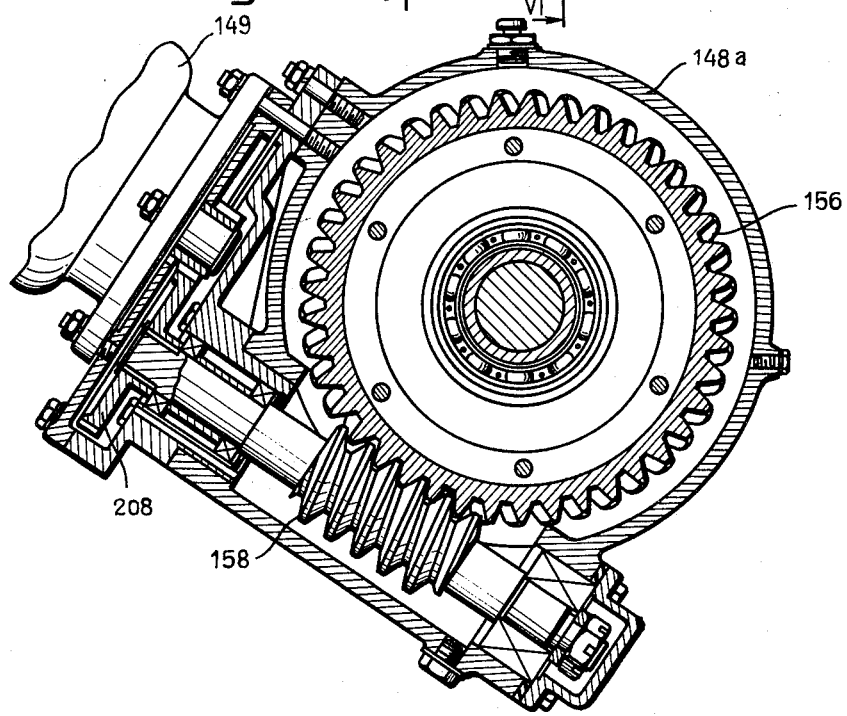
Figure 6 is a vertical sectional view on the line VI—VI of Figure 5.
Figure 5A:
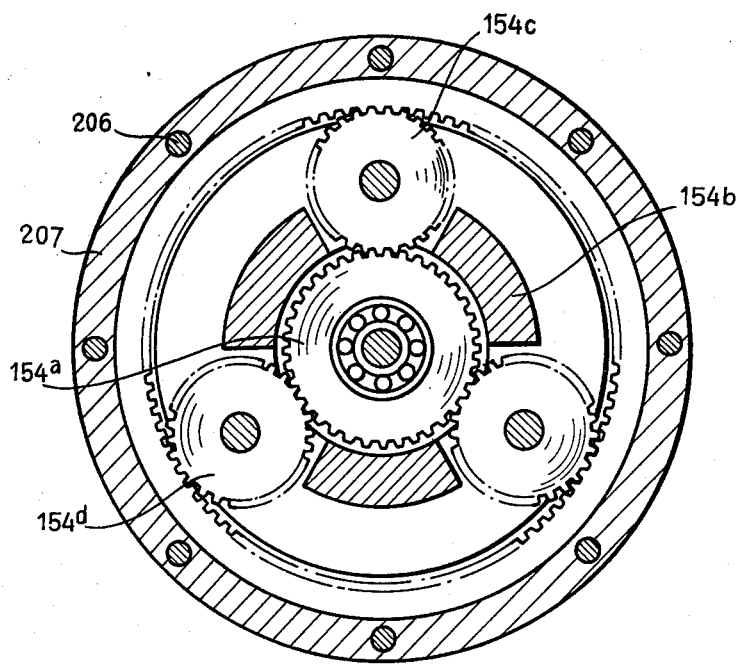
Figure 5a is a sectional view taken along line Va—Va of Fig. 5.

This structure is shown more clearly in Figure 4 of the drawings. Figures 5, 5a and 6 show the structural details of the corrector device 148. The latter is supported, like the driving motor 147 and reduction gear 146, by the transverse member 200 of the main framework of the bridge crane and comprises two epicyclic trains of gears including sun wheels 154a and 155a fast with one another. These trains include at least one planet wheel 154c meshing with a sun wheel 154a and simultaneously with an internally toothed rim 154d and being carried by a carrier 154b fast with a shaft 154e secured by means of a flange 154f to the intermediate shaft portion 150, and at least one planet wheel 155c meshing with the sun wheel 155a and simultaneously with an internally toothed rim 155d and carried by a carrier 155b fast with the shaft 155e secured by means of a flange 155f to the shaft 152 fast with the supporting wheel 3 of the crane. The rim 154d is stationary and is for this purpose secured to the casing 148a of the corrector device, enclosing the epicyclic trains, by means of bolts 206 which are employed for securing the cover 207 to the casing 148a. The rim 155 is secured to a worm wheel 156 rotatably mounted within the casing 148a on the shaft portion 155e fast with the planet wheel carrier 155b. The worm wheel 156 meshes with a worm screw 158 keyed on a shaft driven through a suitable reduction gear 208 by the electric motor 149 which is fed from a three-phase line and is secured to the casing 148a.

When the motor 149 is inoperative and the shaft 150 receives drive from the crane driving motor 147 rotation of the shaft 150 will be fully transmitted to the shaft 152 therefore to the supporting wheel 3 of the crane which will rotate at the same speed as the supporting wheel 2. This is effected because the gear 158—156 is irreversible and the two epicyclic gears in the corrector device are equal to each other. In this case the bridge crane will be displaced along the track-way 4, 5 in a direction and at a speed depending upon the direction and speed of rotation of the driving motor. As current will be fed to the corrector motor 149, the latter rotates the wormwheel 156, and hence the rim 155d in either direction and causes relative rotations of the shafts 150 and 152, hence of the crane supporting wheels 2 and 3, respectively. When this occurs the end truck 203 of the main framework of the bridge crane will advance slower or faster than the end truck 202 and the position of the whole framework of the bridge crane with respect to the trackway 4, 5 will vary accordingly.

Obviously, with a rectilinear track-way there is no need for the corrector motor to operate it the bridge crane runs along the track-way constantly maintaining its correct position with respect to the rails 4 and 5 forming the track-way, thereby keeping its main framework and the axes of its own supporting wheels square with the trackway.

However, the bridge cranes often get out of line and become distorted with respect to their track-way for many reasons, e.g. as a consequence of sliding of one of the supporting driven wheels 2 or 3, so that one of the end trucks of the framework of the crane will be left back with respect to the other and an abnormal pressure exerted between the flanges on the wheels and tracks and the bridge crane may be twisted out of line or the wheels jump completely off the tracks with the danger of seriously damaging the whole plant or at least rendering impossible any displacement of the bridge crane.

When this drawback occurs, the operation of the corrector motor should promptly and automatically restore the correct position of the bridge crane with respect to the track-way.

The improved crane is provided with means responsive to the position of the bridge crane with respect to the track-way, which automatically maintain the corrector motor inoperative when the crane keep its frame-work substantially square with the track-way and cause the rotation of the corrector motor in either direction in order to slow down or fasten one end truck of the crane till it will become newly "squared" and ready for running straight along its track-way.

The last mentioned means generally designated by the reference number 210 in Figure 1 are preferably located at one of the side ends of the crane and supported by one of the end truck structure.

Their construction will now be more particularly described with reference to Figures 7, 8, 9 and 10.

As shown in Figure 7 one end of the bridge crane framework has secured thereto vertical pivots 94 situated in proximity to the rail 5 with the widest possible spacing of the pivots. Bell-crank levers 95 are articulated to the pivots 94 and carry at one end rollers 96 urged against the rail 5 by springs 106.

Bars 98 are articulated at 97 to the other end of each bell-crank lever, said bars 98 being articulated to racks 99 meshing with a pinion 100. The rack 99 and pinion 100 (Figure 8) are guided in a casing made up of parallel plates 101 connected together by bolts 102.

The top plate 101 (Fig. 9) is formed with a slot in which a stem 100a coaxial with and securedly fixed to the pinion 100 is slidable.

The stem 100a is connected to two electric contacts (not shown in Figures 7 to 9) adapted to close their respective circuits (e.g. of two micro-switches (A and B—see Figure 10) the purpose of which will be further explained) on displacement of the stem parallel with itself in either direction within the slot.

The device operates as follows.

Assuming the crane bridge is in its correct position relative to the track-way and the stem 100a is in its neutral position with respect to the contacts, when the bridge is displaced along the track-way 4, 5, while keeping square with the latter, the two levers 95 are counter-rotated through the same angle, whereby the racks are moved by the same extent in opposite directions. In this case the pinion 100 rotates about its own axis without moving along the slot.

If the bridge gets out of line, both levers rotate in the same direction and both racks together with the pinion move parallel with the slot, thereby closing the control circuit of either micro-switches A or B.

Of course, the device shown in Figures 7, 8 and 9 can alternatively be duplicated and applied to both ends of the main framework of the bridge crane.

The micro-switches A and B shown in Figure 10 of the drawings are inserted in a circuit for controlling operation of the corrector motor 149, in such manner as to be rotated in one direction upon closure of the switch A and in an opposite direction upon closure of the switch B and finally, be inoperative when both switches A and B are open.

The distributing network T, S, P feeds the corrector motor 149 with three-phase line current through the three contacts of the two remote control switches D, S. When the contacts of the remote control switch D close, the motor 149 is rotated in a reverse direction. Two phases of the network are connected to the small transformer TR which supplies low-voltage monophase alternating current to the control circuit including the microswitches A, B.

Various circuits are arranged on the low-voltage line. Starting from the right towards the left, the two circuits of the micro-switches A and B energise the coils of the two relays SD, SS. A further circuit feeds the rectifier RAD, said circuit extending through two series of contacts of the relays SD, SS so as to remain closed only when the associated coils are both inoperative or both energised. If one coil only is energised, the rectifier circuit is cut out.

The rectifier RAD energises the coil of a special delay-action relay Z of the magnetic saturation type, having the property of releasing its armature with a certain delay (1 to 2 seconds).

Finally, two circuits feed the two coils D, S of the two main remote control main starting switches for the electric motor 149.

In order to hold closed the circuit of the coil D a number of contacts visible from top to bottom of the diagram should be closed, namely: (1) The contact S which closes if its associated remote control switch is open; (2) the contact SD which closes if its associated relay is energised; (3) the contact Z which closes if the impulse from the micro-switch lasts longer than 1 to 2 seconds (the coil core then becoming disenergised); (4) the contact SS which closes if the associated relay is inoperative. In other words, for the circuit of the coil of the remote control switch D to close, the requirements are: (1) the other remote control switch should be open; (2) the relay SD should be energised by its associated micro switch; (3) the impulse should last longer than 1 to 2 seconds; (4) the relay should be inoperative.

The same processes occur in a reverse order in connection with the circuit of the coil S.

Two lamps LD, LS are shunted in parallel with the coils D for controlling operation of the whole apparatus. Some modified constructions of the means responsive to the position of the bridge with respect to its track-way will now be described with reference to Figures 11, 12, 13 and 14, 15, 16, 17 and 18, respectively.

The propelling unit for the bridge crane described above with reference to Figures 1 to 6 of the drawings is very advantageous, inasmuch as it uses a corrector device which can be provided without any need to modify to a great extent the other mechanisms of the unit. In this manner many existing bridge cranes of the type set forth, but without automatic means for continuously checking their correct position with respect to the rectilinear track-way, can be readily converted at small expense to cranes provided with automatic means for resetting them to their corrected position after they have missed it for any reason.

For this purpose it will be necessary to cut away a portion of the shaft connecting one of the supporting driving wheels of the crane and connect the free ends of the resulting shafts to the planet carriers of the corrector device, further providing on the framework of the bridge crane one of the described devices responsive to the position of the bridge crane with respect to the track-way.

However, when the cost factor is of minor importance or the bridge crane is initially built up for the purpose of equipping it with an automatic corrector device, one of the propelling units shown in Figures 19 and 20 can be advantageously employed.

Figure 12:
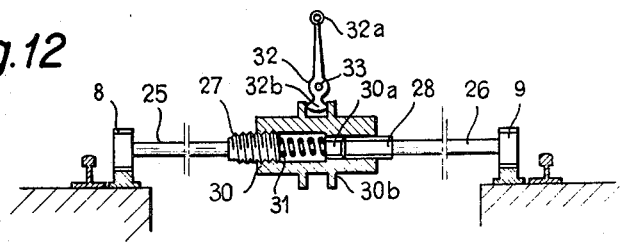
Figure 12 is a diagrammatic side elevational part sectional view of the device responsive to the variation in position of the bridge-crane with respect to the track-way, according to another modification.

In Figures 11 and 12, racks 6, 7 arranged in proximity to the rails 4 and 5 forming the track-way for the bridge crane 8 and 9 denoting coaxial pinions meshing with the said racks. For the sake of simplicity the bridge crane framework and its supporting wheels are not shown.

In Figure 11, the pinion 8 is keyed to the end of a shaft 12, the pinion 9 being keyed to the end of a shaft 13 co-axial with the former; the shaft 12 drives without any change in speed, a shaft 17 through a reversing gear comprising bevel gears 14, 15 and 16. The bevel wheel 14 is keyed to the shaft 12; bevel wheel 15 is keyed to the shaft 17; bevel wheel 16 is keyed to a shaft 18 rotatable in stationary supports 19.

The shaft 17 has keyed thereto a bevel wheel 20 and the shaft 13 has keyed thereto a bevel wheel 21. These wheels are incorporated by a differential gear denoted generally by 22 and which further comprises; the planet wheels 23 rotatably supported in a cage 24 rotatably mounted on shafts 13 and 17.

The cage 23 has fixedly secured thereto an arm 24a adapted to operate a switch or switches adapted to close the circuits of micro-switches shown in Figure 10 in order to cause the driving wheels arranged at opposite bridge ends to relatively rotate to straighten the bridge when it has got out of line.

It will be obvious that, as long as the bridge moves parallel with itself or with its main framework square with the track-way 4, 5, the pinions 8 and 9 rotate synchronously and the cage 24 is held stationary.

When a relative rotation of the pinions 8 and 9 takes place, the cage 24 rotates in either direction operating the above-mentioned switches controlling the corrector motor 149 for straightening the bridge.

Obviously, the shafts 12, 13, 17 and 19 are supported in any convenient manner by the framework of the bridge crane.

In a similar device of modified structure shown in Figure 12 the pinion 8 is keyed to the end of a shaft 25, the pinion 9 being keyed to the end of a shaft 26.

The shaft 25 has keyed thereto a screw 27 preferably of the coarse-pitch multi-threaded type. The shaft 26 ends by a grooved extension 28 and is like the shaft 25 supported by the framework of the bridge crane.

The screw 27 cooperates with a screw-thread tapped bore in an intermediate member or sleeve 30 splined to the extension 28 of the shaft 26 at 30a, whereby the sleeve can rotate and be displaced axially with respect to the shaft 25 and only be displaced axially but not rotate with respect to the shaft 26.

A spring 31 takes up the axial slack of the arrangement. The sleeve 30 is formed with an annular peripheral groove 30b receiving an arm 32b of a lever 32 pivoted at 33 to a stationary shaft.

The end 32a of the lever operates the above mentioned electric switches A and B.

As long as both pinions 8, 9 rotate at the same speed the sleeve 30 rotates therewith but is not axially displaced. Upon differential rotation of the pinions, the screw 27 is screwed up into the sleeve or unscrewed therefrom. Assuming the shaft 25 is prevented from axial displacement, the sleeve will move axially, thereby rotating the lever 32 on its pivot 33 and operating the switches.

Another embodiment of the device responsive to the position of the bridge crane is shown in Figures 13 and 14 comprises a suitably positioned upright guide bushing 80 supported by the framework of the crane and a shaft 81 journalled in said bushing. A lever 82 is secured to one shaft and electrically insulated therefrom and carries at its other end stationary contacts which are caused to contact through rotation of the shaft 81 to framework of the bridge crane two contacts 83, 84 secured to the framework of the bridge but likewise electrically insulated therefrom.

The other end of the shaft 80 has secured thereto a horizontally bored block 85 in which a stem 86 is closely slidable. A head 87 is secured to the stem 86 and is provided with two rollers 88 urged against the side of the rail 5 by a spring 90 tending to draw the head 87 away from the block 85. The orientation of the head 87 to the rail 5 is therefore constant, lateral displacements of the bridge crane framework due to the slack between the rails and flanges on the supporting wheels being taken up by the displacement of the stem 86 in the block 85, whereby the rollers 88 and rail are held in contact. The lever 82 securedly fixed to the block 85 is likewise held in a constant relative orientation to the rail.

Should the bridge get out of line, that is no longer be square with the track-way 4, 5, its framework is rotated with respect to the shaft 81; inasmuch as the contacts 83—84 are secured to the bridge framework, the lever 82 contacts the contact 83 or contact 84, depending upon the direction of deviation of the bridge from its correct position. Under these conditions one of the two electric circuits is closed through the flexible cable 91 connected to the lever 82 and contacts 83 and 84 and switch on, through the relays S or D the correcting device which straightens the bridge. The rail 5 can be substituted for by another guide, should this be desirable for constructional reasons.

In operation the rails or their equivalent guide means cannot always be manufactured and assembled with the required accuracy, still less do these components maintain their initial accuracy with time, so that deflections amounting to some millimeters are not unfrequently ascertained with such guide means, which gives rise to sinuousness of the guides which are liable to result in erroneous operation of the device shown in Figure 13.

In order to eliminate or minimize to an acceptable extent the change of errors occurring, two different measures are simultaneously adopted. The former consists in employing suitably delayed relay (see relay Z in Figure 10) for operating the correcting device, thereby eliminating errors due to accidental unevenness of the guide element, such as discontinuities, foreign bodies caught between the rollers and guide, misalignment of the joints, etc.

The second measure is shown in Figure 15, and consists in the combination of two devices of the type shown in Figure 13 each guided by one of the two track rails for the crane or guides arranged in proximity of said rails.

As in Figure 13, the rail is denoted by 5, the dotted rectangle 1 diagrammatically showing the bridge framework. 82 and 82′ are the levers, 83, 84 and 83′, 84′ are the contacts. 92, 93 denote the coils of relays adapted to start in either direction or stop the motor of the correcting device.

The electric source energizing the relays by direct or alternating current is denoted by 105, both terminals thereof being connected to levers 82, 82′. The circuit is so established that one only of the relay coils is energised when both detector devices detect the incorrect bridge position. This eliminates errors due to slight faults of the rails; inasmuch as faults of one rail will hardly be reproduced in shape and alignment in the other rail.

Figure 16:
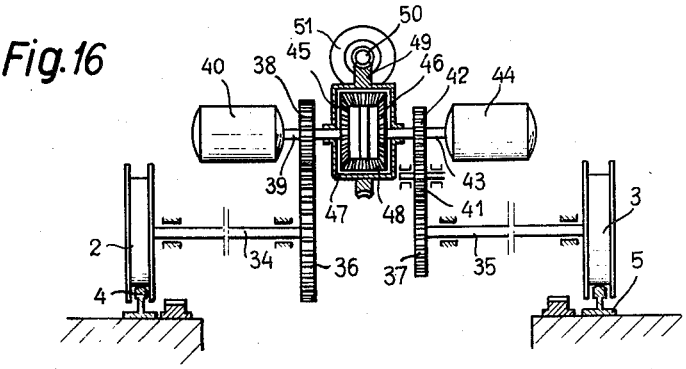
Figures 16 and 17 are diagrammatic side elevational part sectional views of the bridge drive mechanism according to two different modified constructions.

In the embodiment shown in Figure 16 the driving wheel 2 is keyed to the end of a shaft 34, and the driving wheel 3 is keyed to the end of a shaft 35, toothed wheels 36, 37, respectively, being keyed to the opposite ends of the said shafts. Toothed wheel 36 meshes with a toothed wheel 38 keyed to the shaft 39 of an electric motor 40. The toothed wheel 37 meshes with an intermediate reversing gear 41 meshing in turn with a toothed wheel 42 keyed to the shaft 43 of an electric motor 44.

The shafts 39 and 43 of the electric crane driving motors 40, 44, respectively have further keyed thereto toothed wheels 45, 46, respectively, associated with a differential gear comprising a cage 47 and planet wheels 48. The cage 47 has keyed thereto a worm wheel 49 operated by a worm screw 50 keyed to the shaft of a corrector motor 51. The worm gear should be irreversible. The motor 51 is caused to rotate in either direction by the action of the switch operated by the arm 24a on the cage 24 or previously described lever 32, shown in Figures 11 and 12, respectively.

The transmission ratios between the wheels 36, 38 and between the wheels 37, 41, 42 are such that, when the cage 47 is stationary, both motors 40, 44 rotate at the same speed in opposite directions, the supporting driving wheels 2 and 3 of the crane rotating at the same speed and in the same direction.

Should the bridge on travelling lose its correct position with respect to the track-way 4, 5, the switch operated by the arm 24a or lever 32 rotates the corrector motor 51 in either direction, the said motor 51 rotating the differential gearbox, thereby relatively rotating the wheels 2, 3 in a direction such as to restore the bridge straight. Upon straightening of the bridge, the motor 51 is stopped, both wheels 2 and 3 being rotated at the same speed.

The arrangement can be alternatively operated by one driving motor only, when one-half of the available power for propelling the bridge on its track-way flows through the toothed wheels of the differential gear.

Figure 17:
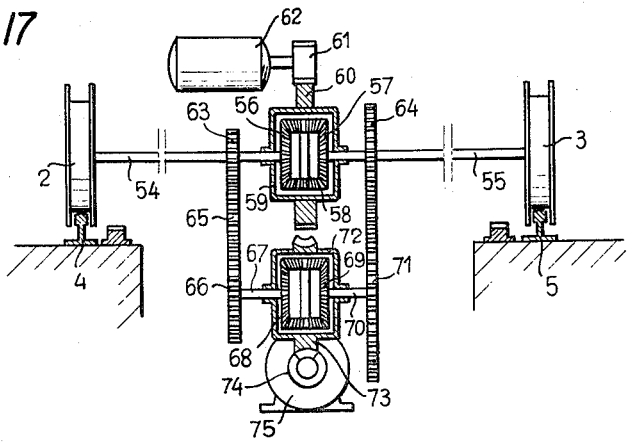

In the modification shown in Figure 17 the wheels 2 and 3 are keyed to shafts 54, 55 having keyed to their ends remote from the wheels 2, 3 bevel wheels 56, 57, respectively of a differential gear comprising planet wheels 58 and a cage 59. A toothed wheel 60 is secured to the cage 59 and meshes with a pinion 61 keyed to the shaft of a propelling motor 62.

Toothed wheels 63, 64, respectively, are keyed to the shafts 54, 55, the toothed wheels 63 meshing with a toothed wheel 65 meshing in turn with a toothed wheel 66 keyed to a shaft 67; the latter has further keyed thereto a toothed wheel 68 of a differential gear having a further toothed wheel 69 keyed to a shaft 70, a further toothed wheel 71 being keyed to the shaft 70 and meshing with the toothed wheel 64.

A worm wheel 73 is secured to the cage 72 of the differential gearbox and meshes with an irreversible worm screw 74 operated by an electric corrector motor 75.

The ratios between the toothed wheels 63, 65, 66 and 64, 71 are such that as the bridge moves maintaining its correct position with respect to the track-way, the corrector motor 75 being stationary, the wheels 68, 69 rotate at the same speed in opposite directions.

The corrector motor 75 is operated through a circuit controlled by the switch driven by the arm 24a or the lever 32 above described with reference to Figures 11 and 12 and is rotated in either direction to relatively rotate the shafts 54 and 55 in such direction as to restore the correct position of the bridge.

The main propelling motors and corrector-motors can, alternatively, be fluid-operated motors driven from a suitable compression station provided on the bridge; this also applies to the controls for actuating the corrector-motors.

What we claim is:

In combination with a pair of parallel spaced rails forming a rectilinear horizontally arranged trackway, an overhead crane of the bridge type comprising, a main framework disposed transversely to the trackway, two end trucks rigidly connected to opposite ends of said main framework, supporting wheels rotatably mounted on said trucks for running on said trackway, said wheels having axes of rotation transverse to said trackway, at least a pair of said supporting wheels carried by opposite end trucks being coaxially arranged driven wheels, two coaxial driving shafts that are respectively connected at their outer ends to the center of said wheels, a propelling unit for propelling the crane along the trackway connected to each of said driving shafts comprising, motor means connected to the driving shafts for rotating them at equal speeds, reduction gearing interposed between said shafts and said motor means, a corrector device connected to said driving shafts operative to cause relative rotation of said driving shafts to maintain the crane framework square with the trackway, a reversible corrector motor connected to operate said corrector device to cause a relative rotation of said driving shafts and supporting driven wheels of the crane to restore the bridge crane to a correct position of squareness relative to the trackway in the event the bridge crane ceases to be substantially square to the trackway, a device on said bridge crane for sensing the position of the bridge crane with respect to squareness relative to the trackway, means responsive to said sensing means interposed between said sensing device and the corrector motor for automatically controllably energizing the corrector motor and causing the corrector motor to rotate in a direction for causing relative rotation of said driving shafts effective to restore the bridge to a position of squareness relative to the trackway when the framework of the bridge crane ceases to be substantially square with the trackway, said corrector device comprising a casing supported by the framework of the crane, a first and a second differential gearing within said casing, each of said differential gearings having a sun gear fast with a sun gear of the other differential gearing and coaxial with the driving shafts connected to the supporting driven wheels of the crane, for each differential gearing an internally toothed outer rim coaxial with said sun gears, each of said differential gearings having planet gears meshing simultaneously with the sun gear and the outer rim thereof, for each differential gearing a cage for rotatably supporting said planet gears, shafts respectively fixed to said cages projecting outwardly from said casing at opposite ends thereof and operatively connected with said reducing gearing interposed between the crane driving motor and the driving shafts connected to said supporting driven wheels of the crane, the internally toothed rim of one of said differential gearings being mounted fast with the casing of the corrector device and the other rim being rotatably mounted thereon, a worm wheel fast with said last mentioned rim, and a worm meshing with said worm wheel connected to said corrector motor for rotation thereby.

References Cited in the file of this patent

UNITED STATES PATENTS

| | | |
|---|---|---|
| 651,573 | Lanchester | June 12, 1900 |
| 1,328,934 | Valls | Jan. 27, 1920 |
| 1,441,190 | Watson | Jan. 2, 1923 |
| 1,534,020 | Baldwin | Apr. 21, 1925 |
| 1,576,702 | Ackerman | Mar. 16, 1926 |
| 1,882,325 | Kendall et al. | Oct. 11, 1932 |
| 2,054,802 | Bronander | Sept. 22, 1936 |
| 2,104,582 | Carlson | Jan. 4, 1938 |

(Other references on following page)

UNITED STATES PATENTS

| | | | |
|---|---|---|---|
| 2,328,362 | Schaitberger | Aug. 31, | 1943 |
| 2,344,199 | Barnard | Mar. 14, | 1944 |
| 2,422,343 | Duer | June 17, | 1947 |
| 2,556,503 | Nelson | June 12, | 1951 |
| 2,666,876 | Sinclair | Jan. 19, | 1954 |
| 2,695,586 | Montrose-Oster | Nov. 30, | 1954 |

FOREIGN PATENTS

| | | | |
|---|---|---|---|
| 587,297 | Germany | Nov. 1, | 1933 |
| 898,454 | France | July 3, | 1944 |
| 1,003,768 | France | Nov. 21, | 1951 |
| 1,089,199 | France | Sept. 22, | 1954 |
| 748,023 | Great Britain | Apr. 18, | 1956 |